US012596716B1

(12) United States Patent
Zhang et al.

(10) Patent No.: US 12,596,716 B1
(45) Date of Patent: Apr. 7, 2026

(54) HIERARCHY FUNCTION RESULT CACHE WITH DYNAMIC CONDITIONS

(71) Applicant: SAP SE, Walldorf (DE)

(72) Inventors: Xun Zhang, Xi'an (CN); Yinghua Ouyang, Xi'an (CN); Zhen Tian, Xi'an (CN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 19/080,996

(22) Filed: Mar. 17, 2025

(51) Int. Cl.
*G06F 16/24* (2019.01)
*G06F 16/22* (2019.01)
*G06F 16/2455* (2019.01)

(52) U.S. Cl.
CPC .... *G06F 16/24552* (2019.01); *G06F 16/2246* (2019.01)

(58) Field of Classification Search
CPC ........................ G06F 16/24552; G06F 16/2246
See application file for complete search history.

(56) References Cited

U.S. PATENT DOCUMENTS

| | | | | |
|---|---|---|---|---|
| 10,545,974 | B2 * | 1/2020 | Brunel | G06F 16/9024 |
| 2003/0167355 | A1 * | 9/2003 | Smith | G06F 8/20 |
| | | | | 719/328 |
| 2006/0026154 | A1 * | 2/2006 | Altinel | G06F 16/24552 |
| | | | | 707/999.005 |

| | | | | |
|---|---|---|---|---|
| 2010/0095066 | A1 * | 4/2010 | Rodgers | G06F 9/54 |
| | | | | 711/E12.001 |
| 2019/0146920 | A1 * | 5/2019 | Hua | G06F 12/0891 |
| | | | | 711/141 |
| 2023/0185804 | A1 * | 6/2023 | Jakschitsch | G06F 16/2455 |
| | | | | 707/718 |

OTHER PUBLICATIONS

Help.sap.com [online], "SAP HANA SQL Reference Guide for SAP HANA Platform: Hierarchy Functions" Mar. 2023, retrieved on Mar. 13, 2025, retrieved from URL <https://help.sap.com/docs/HANA_Service_CF/7c78579ce9b14a669c1f3295b0d8ca16/2969da89b87f4abd85fd0b5f9f5bc395.html>, 2 pages.

* cited by examiner

*Primary Examiner* — Merilyn P Nguyen
(74) *Attorney, Agent, or Firm* — Fish & Richardson P.C.

(57) ABSTRACT

Methods, systems, and computer-readable storage media for a hierarchy function result cache that supports dynamic conditions. An example method includes identifying, in a database system, a request to execute a query that includes a hierarchy function. Dependency objects of the hierarchy function are collected. In response to determining that each dependency object is cacheable, dynamic condition information is collected that includes dynamic conditions of the collected dependency objects and corresponding objects of the dynamic conditions. A cache key is generated based on the collected dependency objects and collected dynamic condition information. A hierarchy function result cache is searched for a cache result that matches the cache key. In response to locating the cache result that matches the cache key, the cache result is identified as a hierarchy function result without executing the hierarchy function. The hierarchy function result us used to generate a query result for the query.

20 Claims, 7 Drawing Sheets

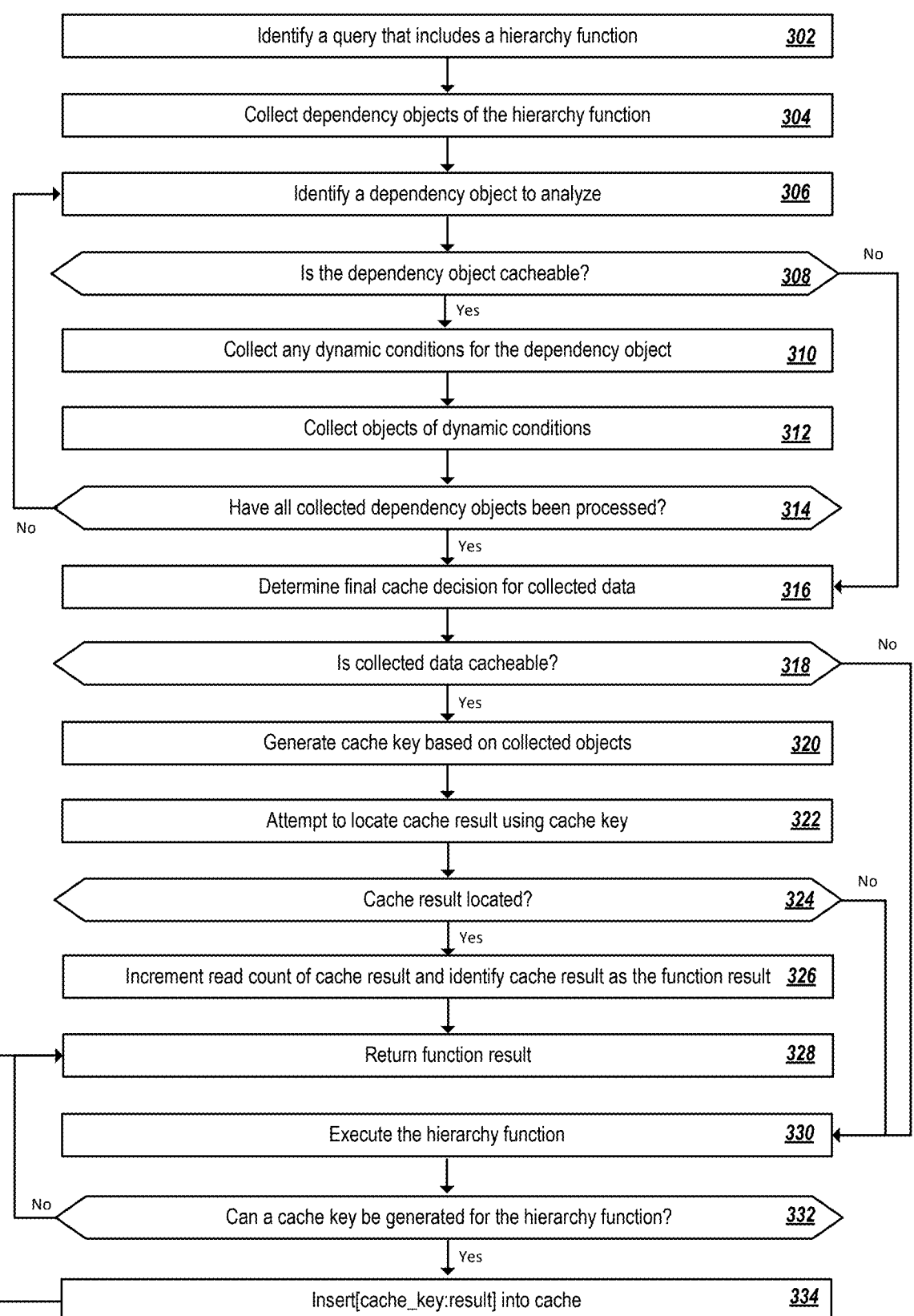

| Identify a query that includes a hierarchy function | _302_ |

| Collect dependency objects of the hierarchy function | _304_ |

| Identify a dependency object to analyze | _306_ |

Is the dependency object cacheable? _308_ — No

Yes

| Collect any dynamic conditions for the dependency object | _310_ |

| Collect objects of dynamic conditions | _312_ |

Have all collected dependency objects been processed? _314_

No — Yes

| Determine final cache decision for collected data | _316_ |

Is collected data cacheable? _318_ — No

Yes

| Generate cache key based on collected objects | _320_ |

| Attempt to locate cache result using cache key | _322_ |

Cache result located? _324_ — No

Yes

| Increment read count of cache result and identify cache result as the function result | _326_ |

| Return function result | _328_ |

| Execute the hierarchy function | _330_ |

Can a cache key be generated for the hierarchy function? _332_

No — Yes

| Insert[cache_key:result] into cache | _334_ |

FIG. 3 _300_

```
--view with hierarchy function that has source qy
CREATE VIEW "TEST_SCHEMA"."V_ASSOC_PARAM_HIER" AS

SELECT * FROM HIERARCHY ⌐406

(SOURCE (SELECT * FROM "TEST_SCHEMA"."V_ASSOC_PARAM") ⌐408

SIBLING ORDER BY NODE_ID)
SELECT * FROM "TEST_SCHEMA"."V_ASSOC_PARAM_HIER"
```

```
---create a SQL view protected by row level security
create column table "TEST_SCHEMA"."T_ASSOC_PARAM" (PARENT_ID nvarchar(2),
NODE_ID
   nvarchar(2), TREE_ID INTEGER, AMOUNT INTEGER);
insert into "TEST_SCHEMA"."T_ASSOC_PARAM" values (NULL, 'A1', '1', 100);
insert into "TEST_SCHEMA"."T_ASSOC_PARAM" values ('A1', 'B1', '1', 200);
insert into "TEST_SCHEMA"."T_ASSOC_PARAM" values ('B1', 'C1', '1', 300);
insert into "TEST_SCHEMA"."T_ASSOC_PARAM" values (NULL, 'A2', '2', 400);
insert into "TEST_SCHEMA"."T_ASSOC_PARAM" values ('A2', 'B2', '2', 500);
insert into "TEST_SCHEMA"."T_ASSOC_PARAM" values ('A2', 'B3', '2', 600);
```

`502` — braces group the above block

```
CREATE VIEW "TEST_SCHEMA"."V_ASSOC_PARAM" AS (SELECT * FROM
TEST_SCHEMA"."T_ASSOC_PARAM") WITH STRUCTURED FILTER CHECK;
```

`504` — brace; `506` — pointer

```
---create permission table
CREATE COLUMN TABLE "DYNAMIC_SQL_SF_SCHEMA"."TABLE_FOR_DYNAMIC_SF"
("filter_string"
   varchar(5000), "userName" varchar(256));
INSERT INTO "DYNAMIC_SQL_SF_SCHEMA"."TABLE_FOR_DYNAMIC_SF"
   VALUES('TREE_ID = 1', 'SYSTEM');
```

`510` — brace

```
CREATE PROCEDURE "DYNAMIC_SQL_SF_SCHEMA"."PROC_FOR_DYNAMIC_SQL_SF" (OUT VAL
VARCHAR(5000))
                    LANGUAGE SQLSCRIPT SQL SECURITY DEFINER READS SQL DATA AS
                    BEGIN
                         DECLARE v_Val VARCHAR(5000);
                         DECLARE CURSOR c_GetOneOperand FOR
                             SELECT "filter_string" FROM
                                "DYNAMIC_SQL_SF_SCHEMA"."TABLE_FOR_DYNAMIC_SF"
                                WHERE "userName" = SESSION_USER;
                         OPEN c_GetOneOperand;
                         FETCH c_GetOneOperand INTO v_Val;
                         IF c_GetOneOperand::NOTFOUND THEN
                             VAL = NULL;
                         ELSE
                             VAL = v_Val;
                         END IF;
                         CLOSE c_GetOneOperand;
                    END;
```

`512` — brace

```
---create row level security
---to bind protected database object and condition provider procedure
CREATE STRUCTURED FILTER "TEST_SCHEMA"."SQLSF_FOR_SQL_VIEW" FOR SELECT ON
   "TEST_SCHEMA"."V_ASSOC_PARAM" CONDITION PROVIDER
   "DYNAMIC_SQL_SF_SCHEMA"."PROC_FOR_DYNAMIC_SQL_SF";
```

`508` — brace

FIG. 5 500

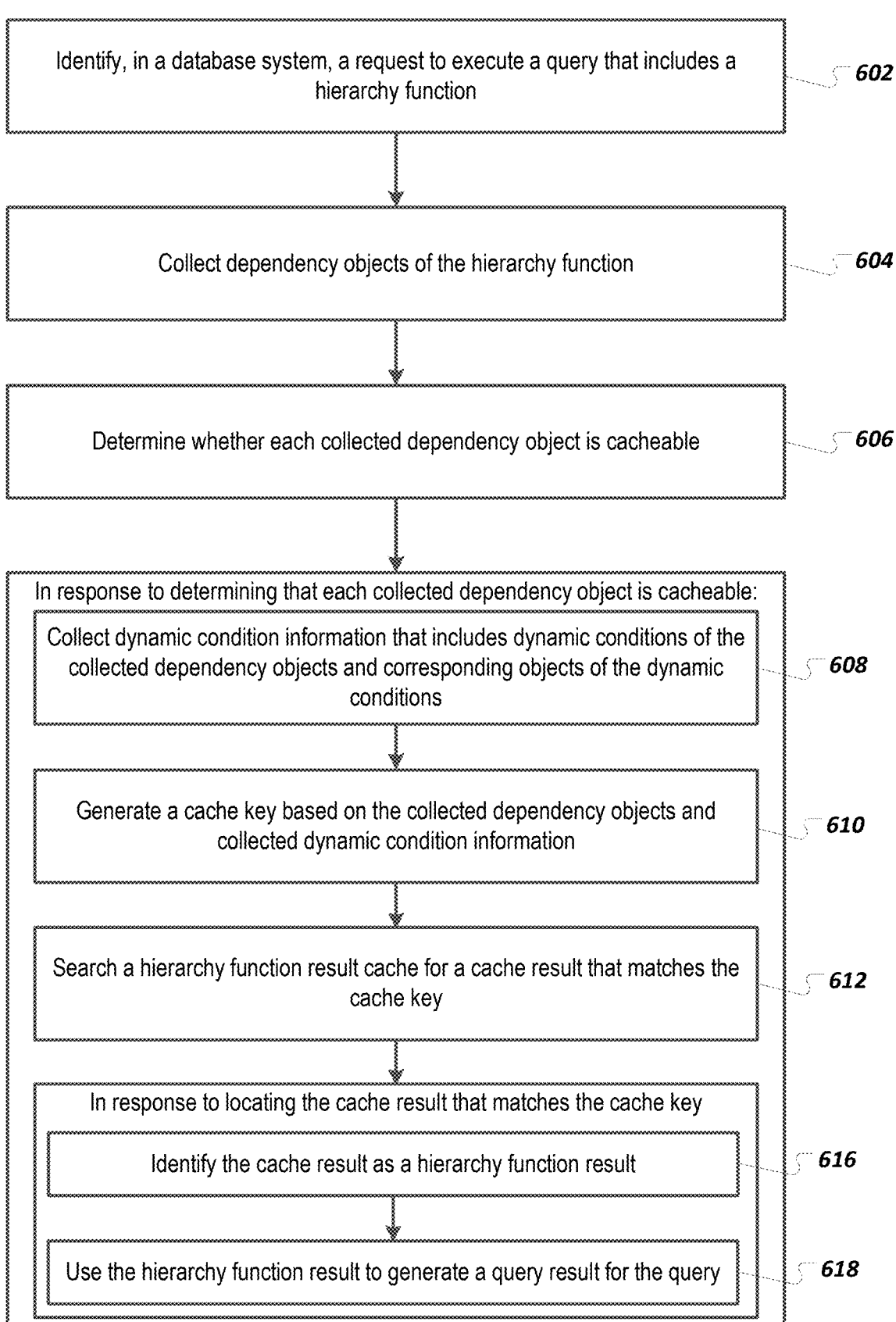

Identify, in a database system, a request to execute a query that includes a hierarchy function ⟋ 602

Collect dependency objects of the hierarchy function ⟋ 604

Determine whether each collected dependency object is cacheable ⟋ 606

In response to determining that each collected dependency object is cacheable:

Collect dynamic condition information that includes dynamic conditions of the collected dependency objects and corresponding objects of the dynamic conditions ⟋ 608

Generate a cache key based on the collected dependency objects and collected dynamic condition information ⟋ 610

Search a hierarchy function result cache for a cache result that matches the cache key ⟋ 612

In response to locating the cache result that matches the cache key

Identify the cache result as a hierarchy function result ⟋ 616

Use the hierarchy function result to generate a query result for the query ⟋ 618

FIG. 6          *600*

HIERARCHY FUNCTION RESULT CACHE WITH DYNAMIC CONDITIONS

BACKGROUND

Some databases can support hierarchy functions. A hierarchy function can help users work with table data that includes rows that are arranged in a hierarchical structure, such as a tree or graph. A database can support hierarchy functions for generating and navigating hierarchical data, for example.

SUMMARY

Implementations of the present disclosure are directed to a hierarchy function result cache that supports dynamic conditions. In some implementations, actions include: identifying, in a database system, a request to execute a query that includes a hierarchy function; collecting dependency objects of the hierarchy function; determining whether each collected dependency object is cacheable; and in response to determining that each dependency object is cacheable: collecting dynamic condition information that includes dynamic conditions of the collected dependency objects and corresponding objects of the dynamic conditions; generating a cache key based on the collected dependency objects and collected dynamic condition information; searching a hierarchy function result cache for a cache result that matches the cache key; and in response to locating the cache result that matches the cache key: identifying, without executing the hierarchy function, the cache result as a hierarchy function result; and using the hierarchy function result to generate a query result for the query.

These and other implementations can each optionally include one or more of the following features. The dependency objects can include a source query of the hierarchy function. The method can include, in response to failing to locate a cache result that matches the cache key: executing the hierarchy function to generate the hierarchy function result; and using the hierarchy function result to generate the query result for the query. The method can include adding an entry that includes the hierarchy function result to the hierarchy function result cache. The method can include, in response to determining that at least one dependency object is not cacheable: executing the hierarchy function to generate the hierarchy function result; and using the hierarchy function result to generate the query result for the query. Determining that a first dependency object is not cacheable can include determining that a dynamic condition of the first dependency object is non-deterministic. Determining that the dynamic condition of the first dependency object is non-deterministic can include determining that the dynamic condition is based on at least one of a current user or a current time. The method can include incrementing a cache read count for the cache result in response to locating the cache result that matches the cache key. The hierarchy function can operate on hierarchical data in the database system.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIG. 3 depicts an example process that can be executed in accordance with implementations of the present disclosure.

FIG. 4 illustrates example database code that includes a hierarchy function.

FIG. 5 illustrates example database code.

FIG. 6 is a flowchart that depicts an example process that can be executed in accordance with implementations of the present disclosure.

Like reference symbols in the various drawings indicate like elements.

DETAILED DESCRIPTION

Figure 1:
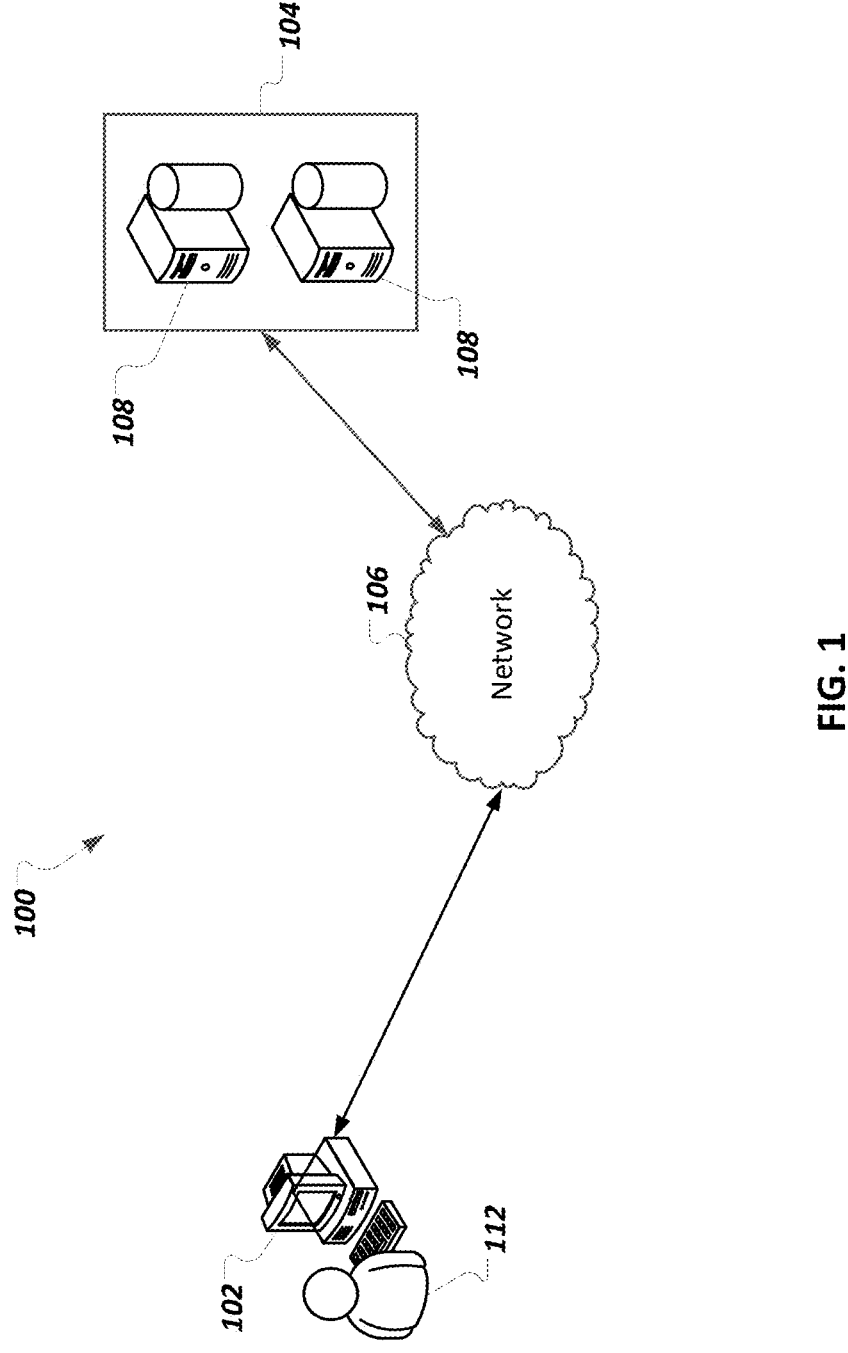
FIG. 1 depicts an example architecture in accordance with implementations of the present disclosure.

Implementations of the present disclosure are directed to a hierarchy function result cache that supports dynamic conditions. In some instances, hierarchy functions can be used in database systems to structure and visualize data in a tree-like format, thereby enabling users to represent parent-child relationships within database data. A database system can include a hierarchy function result cache to cache results of hierarchical functions to avoid unnecessarily repeating execution of a same hierarchy function. Some database systems, by default, do not support use of a hierarchy function result cache if a hierarchy function depends on an object that uses a dynamic condition.

In a database system, dynamic conditions can be used for row-level access control on database objects. In an example scenario, sales data for all regions may be included within one analytic view, but a system requirement may be that regional sales managers should only see data for a region to which they are assigned. In this example, dynamic conditions can be used by the database system to generate different filter strings for different users to enable access to different portions of data in a same view.

For a database system that does not support a hierarchy function result cache with dynamic conditions, a query that involves a hierarchy function and dynamic conditions cannot leverage the hierarchy function result cache to reduce query compilation and execution time. As such, hierarchy function execution is repeated for each execution of the query, even when some results of prior function execution could be reused. Accordingly, query performance can be significantly impacted in such scenarios.

A caching engine can be provided for database systems that do not support a hierarchy function result cache with dynamic conditions to enable leveraging of the hierarchy function result cache for queries that involve hierarchy functions with dynamic conditions. The caching engine can collect, for a query that includes a hierarchy function, dependency objects upon which the hierarchy function depends. The caching engine can retrieve dynamic conditions from collected objects and determine if the dynamic conditions are cacheable. The caching engine can determine an overall caching decision for the hierarchy function based on whether each collected dynamic condition is cacheable. If the overall caching decision is that the hierarchy function is cacheable, the caching engine can generate a cache key based on collected objects and dynamic conditions. Before executing the hierarchy function, a query engine can use the cache key to determine whether a matching cache entry exists in the hierarchy function result cache. If a matching cache entry exists, the matching cache entry can be leveraged to improve query performance. If a matching cache entry does not exist, execution of the hierarchy function can be triggered and a result of the hierarchy function can be cached in the hierarchy function result cache to improve future query performance.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 104 can be a relational database system or can otherwise include a relational database. The server system 104 can include functionality to provide support for leveraging a hierarchy function result cache when executing a query that involves a hierarchy function and dynamic conditions.

Figure 2:
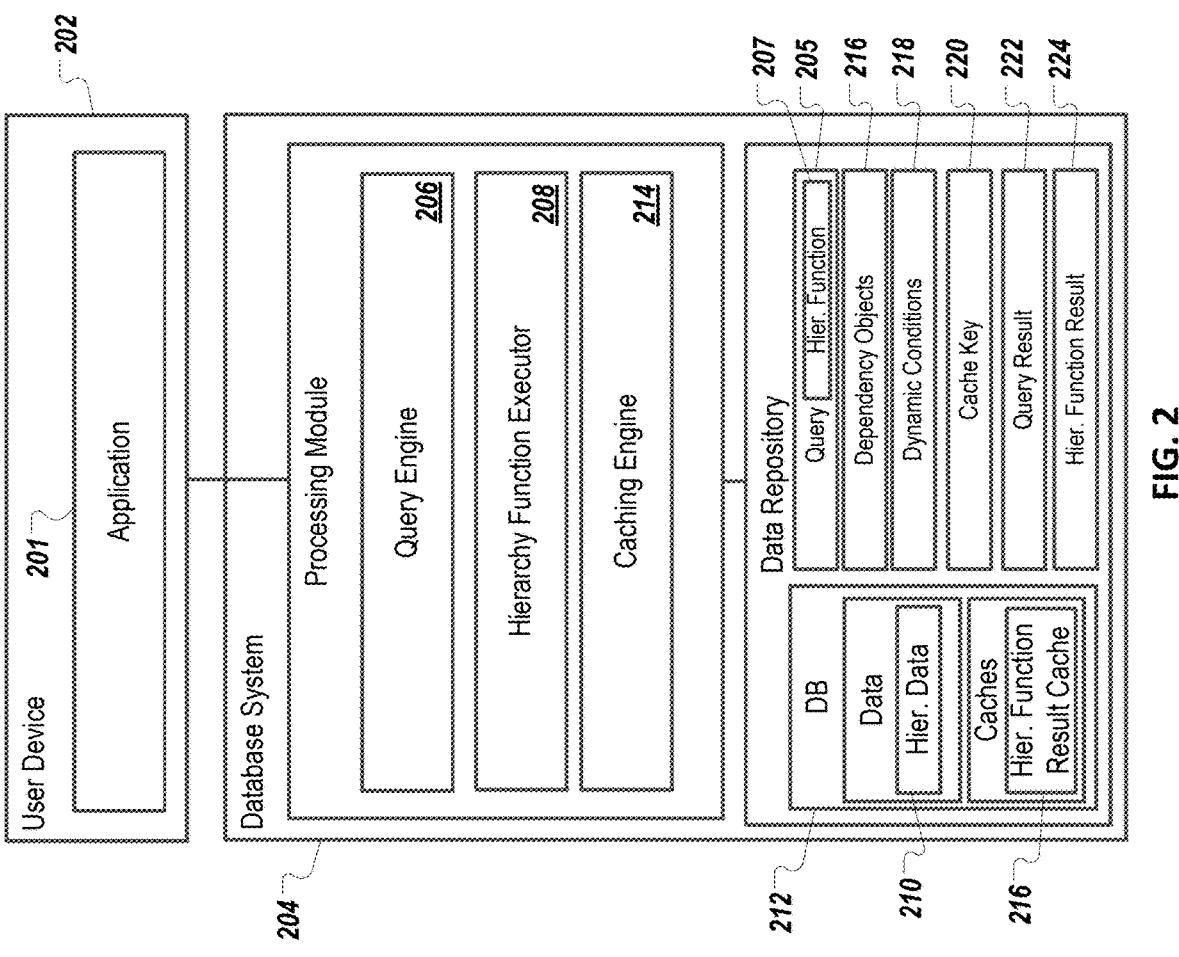
FIG. 2 depicts an example architecture in accordance with implementations of the present disclosure.

FIG. 2 depicts an example architecture 100' in accordance with implementations of the present disclosure. In FIG. 2, the example architecture 100' includes a user device 202 and a database system 204. A user can use an application 201 on the user device 202 to submit a query to the database system 204. The query can be received as a query 205 in the database system 204. A query engine 206 of the database system can process the query 205. The query engine 206 can determine that the query 205 includes or is otherwise based on a hierarchy function 207. The query engine 206 can use a hierarchy function executor 208 to execute the hierarchy function 207. The hierarchy function 207 can operate on hierarchical data 210 stored in a database 212, for example. Before executing the hierarchy function 207, a caching engine 214 can determine whether a hierarchy function result that was generated from a previous execution of the hierarchy function and stored in a hierarchy function result cache 216 can be used during query execution to improve query execution performance.

The caching engine 214 can collect, for the query 205 that includes the hierarchy function 207, dependency objects 216 upon which the hierarchy function 207 depends. The caching engine 214 can retrieve dynamic conditions 218 from collected objects and determine if the dynamic conditions 218 are cacheable. The caching engine 214 can determine an overall caching decision for the hierarchy function 207 based on whether each collected dynamic condition is cacheable. If the caching engine 214 determines that the overall caching decision is that the hierarchy function 207 is cacheable, the caching engine 214 can generate a cache key 220 based on collected objects and dynamic conditions. Before executing the hierarchy function 207, the caching engine 214 can use the cache key 220 to attempt to locate a matching cache entry in the hierarchy function result cache 216. If a matching cache entry exists, the matching cache entry can be leveraged and used to generate a query result 222, without executing the hierarchy function 207, to improve query performance. If a matching cache entry does not exist, the hierarchy function executor 208 can execute the hierarchy function 207 and a hierarchy function result 224 can be cached in the hierarchy function result cache 216 to improve future query performance.

FIG. 3 depicts an example process 300 that can be executed in accordance with implementations of the present disclosure. In some examples, the example process 300 is provided using one or more computer-executable programs executed by one or more computing devices.

A request to execute query that includes a hierarchy function is identified (302). As mentioned, hierarchy functions can be used to interact with hierarchical data. An example hierarchy function is shown in FIG. 4.

FIG. 4 illustrates example database code 400 that includes a hierarchy function. A query 402 queries a view named "V_ASSOC_PARAM_HIER". The view referenced in the query 402 can be created using a create statement 404. The create statement 404 creates the V_ASSOC_PARAM_HIER view using a hierarchy function 406. The hierarchy function 406 has a source query 408. As described below, the source query 408 is protected by row-level security using dynamic conditions.

Referring again briefly to FIG. 3, dependency objects of the hierarchy function are collected (304). The dependency objects can include, for example, a source query of the hierarchy function (e.g., the source query 408 of FIG. 4) as well as dependency objects of the source query of the hierarchy function.

A dependency object to analyze is identified (306).

A determination is made as to whether the dependency object is cacheable (308). For example, a dependency object might not be cacheable if the dependency object is not deterministic. A non-deterministic object may have a dynamic condition that is based on a current time, current user, .etc.

If the dependency object is cacheable, any dynamic conditions that exist for the dependency object are collected (310). FIG. 5 illustrates a dependency object with dynamic conditions.

FIG. 5 illustrates example database code 500. Code statements 502 can be executed by a database system to create an example table object named "T_AS-SOC_PARAM" in a "TEST_SCHEMA" schema. A create view statement 504 can be executed by the database system to create a view object named "V_ASSOC_PARAM". A structured filter check clause 506 in the create view statement 504 indicates that the view may be defined by row-level security using a structured filter.

A code statement 508 can be executed by a database system to create a structured filter named "SQLSF_FOR_SQL_VIEW" in the schema TEST_SCHEMA. A code statement 510 can be executed by the database system to create a "TABLE_FOR_DYNAMIC_SF" permission table for the structured filter. A code statement 512 can be executed by the database system to create a condition provider procedure that implements row level security using the structured filter. At run time, when a user queries the V_ASSOC_PARAM view, the database system can generate a dynamic filter predicate string from the TABL-E_FOR_DYNAMIC_SF permission table by invoking the condition provider procedure. A dynamically generated filter predicate string from the condition provider procedure can be first converted by the database system to a query opti-mizer predicate and then injected into a query plan and applied to query results. As such, the V_ASSOC_PARAM view is a dependency object, with dynamic conditions, of the hierarchy function 406 of FIG. 4.

Referring again to FIG. 3, if any dynamic conditions have been collected, objects of the dynamic conditions are col-lected (312). For example, information for the SQLSF-_FOR_SQL_VIEW structured filter of FIG. 5 can be col-lected. For instance, a filter string of 'TREE_ID=1' can be collected.

A determination is made as to whether all collected dependency objects have been processed (314). If not all collected dependency objects have been processed, a next dependency object is identified (e.g., at step 306) and processed (e.g., at steps 308, 310, and 312).

If all collected dependency objects have been processed as determined at step 314 or if a given dependency object was determined to be uncacheable (e.g., at step 308) a final cache decision for the hierarchy function is determined (316). If all collected dependency objects are cacheable, the final cache decision can be that the data collected for the hierarchy function is cacheable. If step 316 is reached because one of the collected dependency objects it not cacheable, then the final cache decision can be that the data collected for the hierarchy function is not cacheable.

A determination is made as to whether the final cache decision for the hierarchy function is that the data collected for the hierarchy function is cacheable (318).

If the final cache decision for the hierarchy function is that the data collected for the hierarchy function is cacheable, a cache key is generated based on collected objects (320).

An attempt is made to locate a cache result (e.g., cache entry) in a hierarchy function result cache using the cache key (322).

A determination is made as to whether a cache result was located using the cache key (324).

If a cache result was located using the cache key, a read count for the cache result is incremented and the cache result is identified as a function result of the hierarchy function (326).

The identified function result is returned in response to the request to execute the hierarchy function of the query (328).

If a determination was made (at step 324) that a cache result was not able to be located using the cache key or if a determination was made (at step 318) that the data collected for the hierarchy function is not cacheable, the hierarchy function is executed (330).

A determination is made as to whether a cache key can be generated for the hierarchy function (332).

If a cache key cannot be generated for the hierarchy function, the hierarchy function result is returned in response to the request to execute the hierarchy function (e.g., at step 328), without adding a cache entry to the hierarchy function result cache.

If a cache key can be generated for the hierarchy function, an entry is added to the hierarchy function result cache that includes a key of a generated cache key mapped to the hierarchy function result (334). After the entry is added to the hierarchy function result cache, the hierarchy function result is returned in response to the request to execute the hierarchy function (e.g., at step 328).

FIG. 6 is a flowchart that depicts an example process 600 that can be executed in accordance with implementations of the present disclosure. In some examples, the example process 300 is provided using one or more computer-executable programs executed by one or more computing devices.

At 602, a request, in a database system, to execute a query that includes a hierarchy function. The hierarchy function can operate on hierarchical data in the database system.

At 604, dependency objects of the hierarchy function are collected. Dependency objects can be objects upon which the hierarchy function depends. A dependency object can be a source query of the hierarchy function.

At 606, a determination is made as to whether each collected dependency object is cacheable. For example, a determination can be made that a first dependency object is not cacheable based on determining that a dynamic condi-tion of the first dependency object is non-deterministic. The dynamic condition may be non-deterministic based on the dynamic condition being based on a current user and/or a current time, etc.

At 608, in response to determining that each dependency object is cacheable, dynamic condition information is col-lected that includes dynamic conditions of the collected dependency objects and corresponding objects of the dynamic conditions.

At 610, a cache key is generated based on the collected dependency objects and collected dynamic condition infor-mation.

At 612, a hierarchy function result cache is searched for a cache result that matches the cache key.

At 614, in response to locating the cache result that matches the cache key, the cache result is identified, without executing the hierarchy function, as a hierarchy function result. A cache read count can be incremented for the cache result in response to locating the cache result that matches the cache key.

At 616, the hierarchy function result is used to generate a query result for the query.

In response to failing to locate a cache result that matches the cache key, the hierarchy function can be executed to generate the hierarchy function result and the hierarchy function result generated from executing the hierarchy function can be used to generate the query result for the query. An entry that includes the hierarchy function result generated from executing the hierarchy function can be added to the hierarchy function result cache to improve future query performance.

As another example, in response to determining that at least one dependency object collected for the hierarchy function is not cacheable, the hierarchy function can be executed to generate the hierarchy function result and the hierarchy function result can be used to generate the query result for the query.

Figure 7:
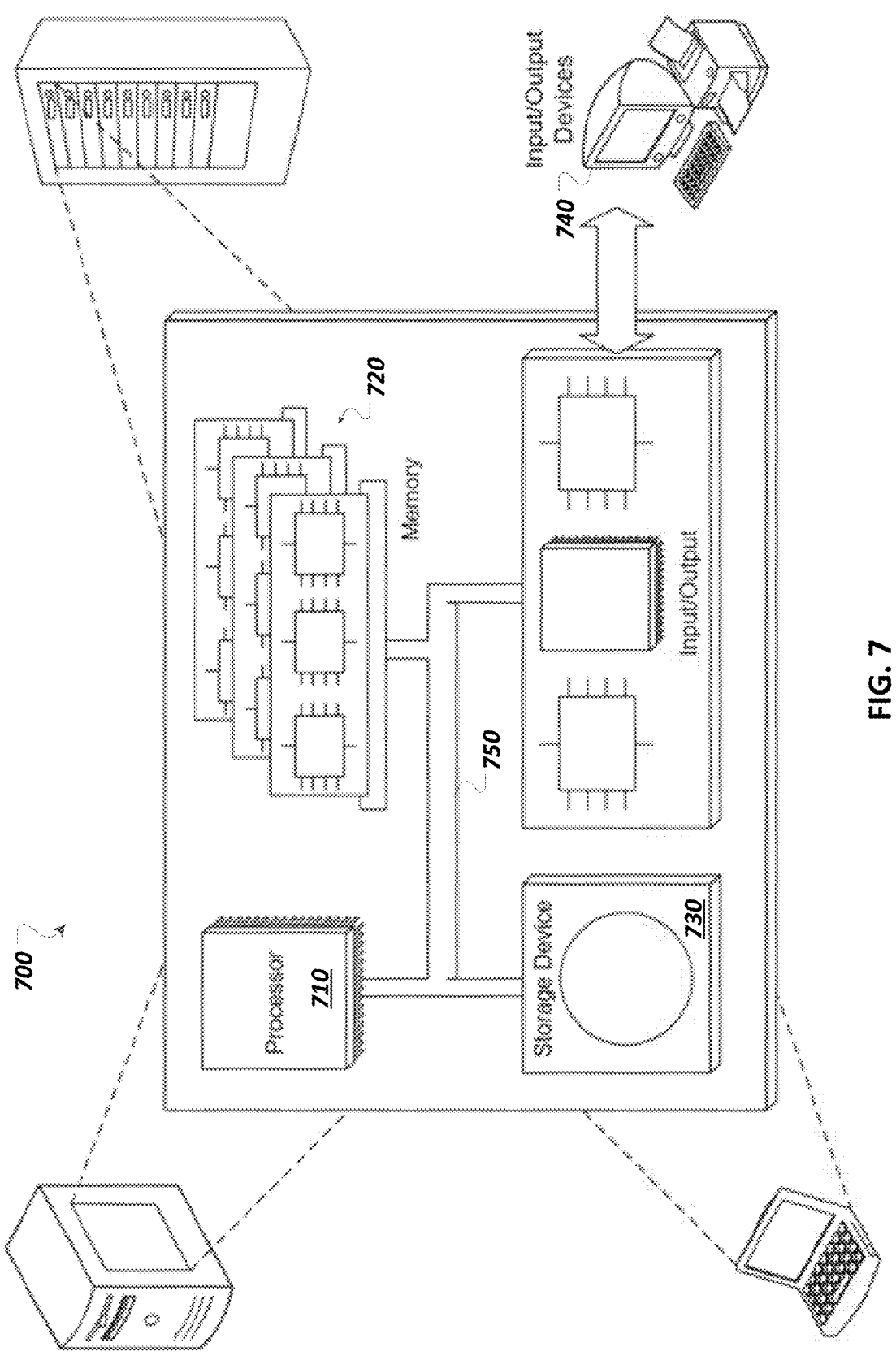
FIG. 7 is a schematic illustration of example computer systems that can be used to execute implementations of the present disclosure.

Referring now to FIG. 7, a schematic diagram of an example computing system 700 is provided. The system 700 can be used for the operations described in association with the implementations described herein. For example, the system 700 may be included in any or all of the server components discussed herein. The system 700 includes a processor 710, a memory 720, a storage device 730, and an input/output device 740. The components 710, 720, 730, 740 are interconnected using a system bus 750. The processor 710 is capable of processing instructions for execution within the system 700. In some implementations, the processor 710 is a single-threaded processor. In some implementations, the processor 710 is a multi-threaded processor. The processor 710 is capable of processing instructions stored in the memory 720 or on the storage device 730 to display graphical information for a user interface on the input/output device 740.

The memory 720 stores information within the system 700. In some implementations, the memory 720 is a computer-readable medium. In some implementations, the memory 720 is a volatile memory unit. In some implementations, the memory 720 is a non-volatile memory unit. The storage device 730 is capable of providing mass storage for the system 700. In some implementations, the storage device 730 is a computer-readable medium. In some implementations, the storage device 730 may be a floppy disk device, a hard disk device, an optical disk device, or a tape device. The input/output device 740 provides input/output operations for the system 700. In some implementations, the input/output device 740 includes a keyboard and/or pointing device. In some implementations, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method comprising:
identifying, in a database system, a request to execute a query that includes a hierarchy function;
collecting dependency objects of the hierarchy function;
determining whether each collected dependency object is cacheable; and
in response to determining that each dependency object is cacheable:
collecting dynamic condition information that includes dynamic conditions of the collected dependency objects and corresponding objects of the dynamic conditions;
generating a cache key based on the collected dependency objects and collected dynamic condition information;
searching a hierarchy function result cache for a cache result that includes a hierarchical function result of a previous execution of the hierarchy function on hierarchical data stored in the database system that matches the cache key; and
in response to locating the cache result that includes the hierarchical function result of the previous execution of the hierarchy function and that matches the cache key:
identifying, without executing the hierarchy function, the cache result as a hierarchy function result; and
using the hierarchy function result to generate a query result for the query.

2. The computer-implemented method of claim 1, wherein the dependency objects include a source query of the hierarchy function.

3. The computer-implemented method of claim 1, further comprising, in response to failing to locate a cache result that matches the cache key:
executing the hierarchy function to generate the hierarchy function result; and
using the hierarchy function result to generate the query result for the query.

4. The computer-implemented method of claim 1, further comprising adding an entry that includes the hierarchy function result to the hierarchy function result cache.

5. The computer-implemented method of claim 1, further comprising, in response to determining that at least one dependency object is not cacheable:
executing the hierarchy function to generate the hierarchy function result; and
using the hierarchy function result to generate the query result for the query.

6. The computer-implemented method of claim 1, wherein determining that a first dependency object is not cacheable comprises determining that a dynamic condition of the first dependency object is non-deterministic.

7. The computer-implemented method of claim 6, wherein determining that the dynamic condition of the first dependency object is non-deterministic comprises determining that the dynamic condition is based on at least one of a current user or a current time.

8. The computer-implemented method of claim 1, further comprising incrementing a cache read count for the cache result in response to locating the cache result that matches the cache key.

9. The computer-implemented method of claim 1, wherein the hierarchy function operates on hierarchical data in the database system.

10. A system comprising:
one or more computers; and
a non-transitory computer-readable storage medium coupled to the one or more computers having instructions stored thereon which, when executed by the one or more computers, cause the one or more computers to perform operations comprising:
identifying, in a database system, a request to execute a query that includes a hierarchy function;
collecting dependency objects of the hierarchy function;
determining whether each collected dependency object is cacheable; and
in response to determining that each dependency object is cacheable:
collecting dynamic condition information that includes dynamic conditions of the collected dependency objects and corresponding objects of the dynamic conditions;
generating a cache key based on the collected dependency objects and collected dynamic condition information;
searching a hierarchy function result cache for a cache result that includes a hierarchical function result of a previous execution of the hierarchy function on hierarchical data stored in the database system that matches the cache key; and
in response to locating the cache result that includes the hierarchical function result of the previous execution of the hierarchy function and that matches the cache key:
identifying, without executing the hierarchy function, the cache result as a hierarchy function result; and
using the hierarchy function result to generate a query result for the query.

11. The system of claim 10, wherein the dependency objects include a source query of the hierarchy function.

12. The system of claim 10, wherein the operations further comprise, in response to failing to locate a cache result that matches the cache key:
executing the hierarchy function to generate the hierarchy function result; and
using the hierarchy function result to generate the query result for the query.

13. The system of claim 10, wherein the operations further comprise adding an entry that includes the hierarchy function result to the hierarchy function result cache.

14. The system of claim 10, wherein the operations further comprise, in response to determining that at least one dependency object is not cacheable:
executing the hierarchy function to generate the hierarchy function result; and
using the hierarchy function result to generate the query result for the query.

15. The system of claim 10, wherein determining that a first dependency object is not cacheable comprises determining that a dynamic condition of the first dependency object is non-deterministic.

16. A non-transitory computer-readable storage medium coupled to one or more processors and having instructions stored thereon, which, when executed by the one or more processors, cause the one or more processors to perform operations comprising:

identifying, in a database system, a request to execute a query that includes a hierarchy function;

collecting dependency objects of the hierarchy function;

determining whether each collected dependency object is cacheable; and in response to determining that each dependency object is cacheable:

collecting dynamic condition information that includes dynamic conditions of the collected dependency objects and corresponding objects of the dynamic conditions;

generating a cache key based on the collected dependency objects and collected dynamic condition information;

searching a hierarchy function result cache for a cache result that includes a hierarchical function result of a previous execution of the hierarchy function on hierarchical data stored in the database system that matches the cache key; and in response to locating the cache result that includes the hierarchical function result of the previous execution of the hierarchy function and that matches the cache key:

identifying, without executing the hierarchy function, the cache result as a hierarchy function result; and using the hierarchy function result to generate a query result for the query.

17. The non-transitory computer-readable storage medium of claim 16, wherein the dependency objects include a source query of the hierarchy function.

18. The non-transitory computer-readable storage medium of claim 16, wherein the operations further comprise, in response to failing to locate a cache result that matches the cache key:

executing the hierarchy function to generate the hierarchy function result; and using the hierarchy function result to generate the query result for the query.

19. The non-transitory computer-readable storage medium of claim 16, wherein the operations further comprise adding an entry that includes the hierarchy function result to the hierarchy function result cache.

20. The non-transitory computer-readable storage medium of claim 16, wherein the operations further comprise, in response to determining that at least one dependency object is not cacheable:

executing the hierarchy function to generate the hierarchy function result; and using the hierarchy function result to generate the query result for the query.

\* \* \* \* \*